United States Patent [19]

Cameron

[11] 4,413,169

[45] Nov. 1, 1983

[54] ELECTRO-SLAG WELDING PROCESS FOR IRREGULAR SECTIONS

[75] Inventor: John Cameron, Kingston, Canada

[73] Assignee: Queen's University at Kingston, Kingston, Canada

[21] Appl. No.: 338,591

[22] Filed: Jan. 11, 1982

[30] Foreign Application Priority Data

Jan. 23, 1981 [CA] Canada .................................. 369258

[51] Int. Cl.³ ............................................ B23K 25/00
[52] U.S. Cl. ...................................... 219/73.1; 219/53
[58] Field of Search ................... 219/73.1, 53, 137.2, 219/73, 137 R

[56] References Cited

U.S. PATENT DOCUMENTS

3,192,356  6/1965  Shrubsall ............................ 219/73.1
3,291,955 12/1966  Shrubsall et al. .................. 219/73.1

FOREIGN PATENT DOCUMENTS

51-1656  1/1976  Japan .................................. 219/73.1

Primary Examiner—B. A. Reynolds
Assistant Examiner—Alfred S. Keve
Attorney, Agent, or Firm—Richard J. Hicks; Stanley E. Johnson

[57] ABSTRACT

An electro-slag welding method and apparatus has been developed for butt-joint welding of steel rails or other metallic pieces having irregular cross section, in which the head and the web of the rail is surrounded with a conventional water cooled copper mold and the flange area is surrounded by a ceramic lined crucible. In addition to the conventional single central welding electrode, two or more electrodes are inserted through the lids of the ceramic crucible adjacent the outer ends of the rail flange so as to reduce the total welding current required to produce a complete flange weld and spread the welding energy, thereby reducing excess power and overheating at the central electrode, resulting in better metallurgical quality welds.

14 Claims, 4 Drawing Figures

ELECTRO-SLAG WELDING PROCESS FOR IRREGULAR SECTIONS

FIELD OF THE INVENTION

This invention relates to butt-joint welding of spaced metallic members having irregular cross sectional shape and more particularly to electric submerged melt (or electro-slag) welding of steel rails in which water cooled side wall molds and ceramic flange molds are used during the welding operation which is conducted in a vertical mode from bottom to top of the space between opposing end faces of the rails to be joined.

In-track railroad rail welding has conventionally been conducted using the Goldschmidt or Thermit welding process, the success of which depends in large part upon the skill of the operator and upon long and intensive preheating of the rail ends prior to welding, which considerably alters the properties of the rails in heat-affected zones. By the nature of the process itself, the weld metal produced has a high inclusion content and there is a high rejection rate. In general, Thermit welds produced in the field do not perform as well in service as do inplant welds made be a Flash-Butt Welding process. Flash-butt welding is not, however, practical in the field because of equipment limitations.

DISCUSSION OF PRIOR ART

Various attempts have been made in the past to employ submerged arc and electro-slag welding techniques in-the-field but none have been successful, generally because the cross-section of the rails to be welded is so complicated it has heretofore been difficult, if not impossible, to obtain a sound weld at the extremities of the bottom flange without seriously overheating the web area. In this regard, reference is made to Canadian Pat. No. 735,307 issued May 31, 1966 to Gilson et al wherein only a central parallelipiped is welded by a submerged arc technique and the flange area is blanked off by ceramic dams for subsequent welding. The resulting welds have relatively poor metallurgical properties. Reference is also made to Canadian Pat. No. 787,550 issued June 11, 1968 also to Gilson et al wherein ceramic molds are employed to conserve welding heat around the web but wherein the bottom flanges are separately welded, following removal of the molds, except in those rare instances when the rail can be inverted and the flange welded at the top as part of a single welding operation.

OBJECTS OF PRESENT INVENTION

It is an object of the present invention to provide a method and apparatus for in-situ single stage electro-slag butt-joint welding of irregularly shaped metallic members which overcomes the difficulties and disadvantages of the prior art and which produces high quality welds throughout the head, web and flanges of a rail or like section.

Thus, by one aspect of the invention there is provided a method of welding a butt-joint between spaced opposing end faces of elongated metallic members having an irregular cross sectional area corresponding to head, web and flange parts of a railroad rail, which comprises:

(a) providing a ceramic-lined crucible, including electrically conductive means, to substantially completely enclose said flange parts adjacent the end faces to be welded;

(b) positioning a consumable, metal, central electrode substantially vertically in said crucible in alignment with said web;

(c) positioning at least two additional electrodes substantially vertically in said crucible adjacent to respective outer ends of said flanges;

(d) providing means in said crucible whereby an arc may be struck between said central electrode and said electrically conductive means;

(e) locating wall molds on opposite sides of said web and head parts adjacent said end faces to be welded thereby forming a mold space adjacent and in fluid communication with said crucible;

(f) adding a submerged melt welding slag composition to said crucible;

(g) supplying electric welding current to said central electrode and electrically conductive means to melt said welding composition, said central electrode at the tip thereof and adjacent metal of said end faces and at least partially fill said crucible with weld metal under a blanket of molten submerged melt welding composition;

(h) supplying electric welding current to said additional electrodes and weld metal while continuing to supply welding current to said central electrode so as to completely fill said crucible and fusion weld said flange parts together; and (i) continuously melting said central electrode downwardly towards the melt until the mold space between said wall molds and said web and head end faces is filled with weld metal under a blanket of molten submerged-melt welding composition, thereby fusion welding said web and head parts together.

By another aspect of the invention there is provided apparatus for butt-joint welding of metallic members having an irregular cross-sectional area corresponding to head, web and flange parts of a railroad rail, comprising:

a ceramic lined crucible having lid means and including an electrically conductive means, to substantially completely enclose said flange parts adjacent to said joint;

weld metal contour shaping conductive molds located on opposite sides of said web and head at such joint;

a central, consumable, metal electrode disposed substantially vertically in said crucible in alignment with said web;

at least two additional electrodes disposed through said lid means and extending into said crucible adjacent to respective outer ends of said flanges;

and electric submerged melt welding means including means for continuously feeding a submerged melt welding composition into said crucible, means for supplying electric welding current to said central electrode and electrically conductive means so as to melt said welding composition and adjacent metal to at least partially fill said crucible with weld metal and a protective blanket of molten said composition, means for supplying electric welding current to said additional electrodes and weld metal while continuing to supply current to said central electrode so as to completely fill said crucible with weld metal, and means for continuing to supply current to said central electrode and feed submerged melt welding composition until the space between said molds on opposite sides of said web and head is filled.

DESCRIPTION OF DRAWINGS

The invention will be described in more detail hereinafter with reference to the drawings in which.

DETAILED DESCRIPTION

Figure 1:
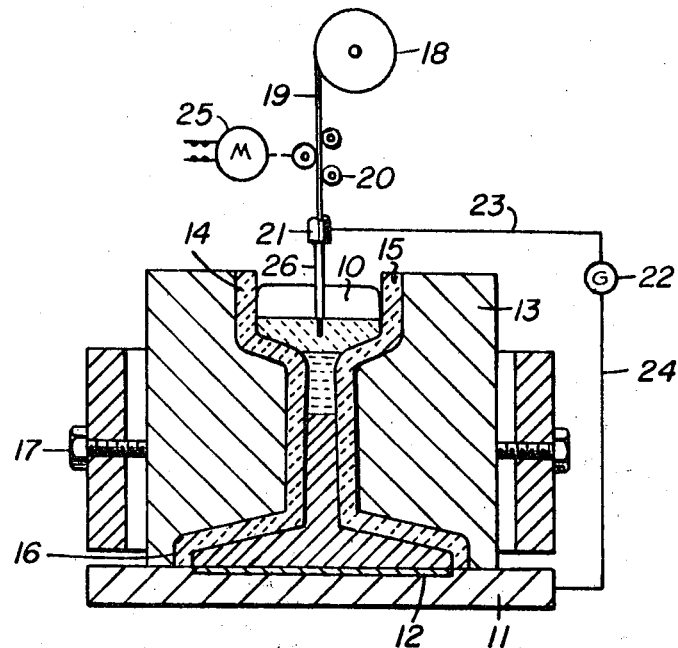
FIG. 1 is a cross-sectional view of an apparatus according to the prior art.

Referring firstly to the prior art apparatus illustrated in FIG. 1, rails 10 to be welded are arranged in longitudinal alignment with their end faces spaced apart by a conventional spacing for welding, of the order of ¾ of an inch. An electrically conductive base plate 11 is provided beneath the joint and covered with a backup steel strip 12. Copper wall moulds 13, preferably water cooled, are provided on opposite sides of the joint adjacent the rail end portions. Precast ceramic inserts 14 are positioned in vertical grooves 15 provided in wall moulds 13 in order to retain as much welding heat as possible in the area adjacent the web of the rail sections. Inserts 14 have lower extensions 16 which extend, as shown in FIG. 1, around the entire side contour of the rail end faces to a position flush with the backup strip 12 in order to retain welding heat in the region of the flange. The wall moulds 13 are clamped in place by suitably placed clamps and adjusting screws 17. Welding is effected with a submerged arc welding apparatus including a reel 18 and a consumable metal wire or rod electrode 19 which is drawn by feed rolls 20 and advanced through a contact tube 21 above the joint to be welded. A generator or the like 22 provides electric welding current through a lead 23 to the contact tube 21 and a lead 24 to base plate 11. A motor 25 drives feed rolls 20 in accordance with conventional feed and control principles. Below contact tube 21 is a consumable uncoated steel guide tube 26.

A submerged melt welding composition generally in the form of granules is supplied to space between the rail ends in an amount sufficient to cover the tip of electrode 19 in its fully lowered position and an arc struck using any conventional technique such as a ball of steel wool. The welding composition and the tip of the electrode 19 melt and form a molten pool which theoretically rises to fill the flange area and then upwardly through the web area and into the head. The ceramic inserts act to thermally confine the heat of the molten composition as welding progresses, thereby increasing the temperature of the molten material and raising the electrical conductivity thereof. In practise, however, it has been found that even the use of ceramic molds is unsufficient to maintain a molten bath throughout the flange area and thus effect a full weld in this area unless special techniques are employed, such as inverting the rail structure and commencing the weld in the head area, progressing down the web into the flange area where an oscillating electrode, known in the art, is employed, or by using excessively high welding amperages of the order of 1000 amps D.C. at 35 volts. Clearly these approaches are not practical for in-situ field welding where inversion is impossible and where portable welders are generally limited to about 600 amps D.C., and generally the prior art has had to settle for a two stage welding operation in which only the flange area directly below the web is welded continuously with the web and the outer edges of the flanges are welded separately with the attendent disadvantages of additional weld preparation and incomplete welding slag entrapment, or inclusions or generally poor metallurgical quality. On those rare occasions where a sufficiently large pool of molten weld metal can be produced to competely weld the outer extremities of the flanges, it has been found that the temperatures of the metal in the central area directly below the single electrode is so high, that metallurgical quality and integrity of the weld is seriously prejudiced due to cooling cracks and the like.

Recognizing that merely surrounding the flange area with ceramic material is not sufficient to provide a molten pool of weld metal which extends to the extremities of the flanges without serious overheating in the web area, a completely different approach has, in accordance with the present invention, now been taken.

Figure 2:
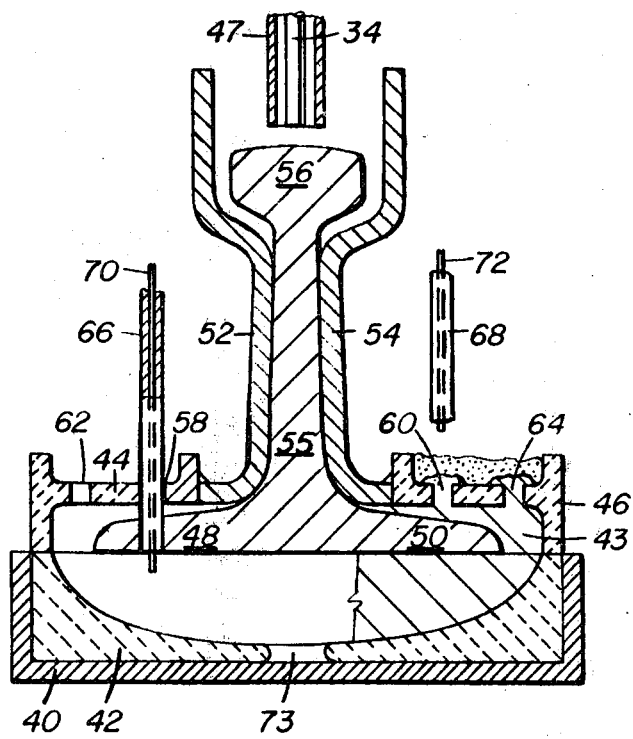
FIG. 2 is a cross-sectional view of one embodiment of the apparatus of the present invention for butt-welding rail joints.

As seen in FIG. 2, a mild steel box 40 is placed beneath a rail joint to be welded, and is lined with a pressure-formed, high-purity, low-alkali fine clay ceramic liner 42 to form a crucible and a two-lid assembly 43, surrounding and spaced from the rail flange. This crucible volume serves as a self-preheating feature of this invention. Refractory lids 44, 46 are placed longitudinally on each side of the rail over the box 40 with its liner 42, so as to enclose the flanges 48, 50 of the rails and provide generous run-past volume 43 to aid total fusion of the flange section. Conventional water cooled copper molds 52, 54 are provided in close contact with web 55, in known manner and extend upwardly around the head 56 but laterally spaced therefrom. Lids 44, 46 are firmly luted to molds 52, 54 respectively with any suitable refractory cement. Lids 44, 46 are provided with holes 58, 60 respectively and optionally may be provided with vent holes 62, 64. Mild steel consumable guide tubes 66, 68 similar to tube 47 of the central electrode are inserted through holes 58, 60 respectively. Tube 66 is shown in position at the start of welding and tube 68 is shown as it appears at the end of a welding operation. Comsumable steel electrode wires (typically 0.14C, 2.0Mn, 0.03Si, 0.024S, 0.017P, Bal. Fe) 70, 72 are fed from reels (not shown) through a respective guide tube 66, 68 and melted back is known manner as welding progresses using a conventional welding apparatus such as a Linde VI 1000 amp D.C. welding unit. A central consumable electrode 34 from a reel (not shown) is similar in all respects to the single welding electrode 19 described with reference to the prior art, is also provided and is used simultaneously with electrodes 66 and 68 for welding in the flange areas.

Figure 3:
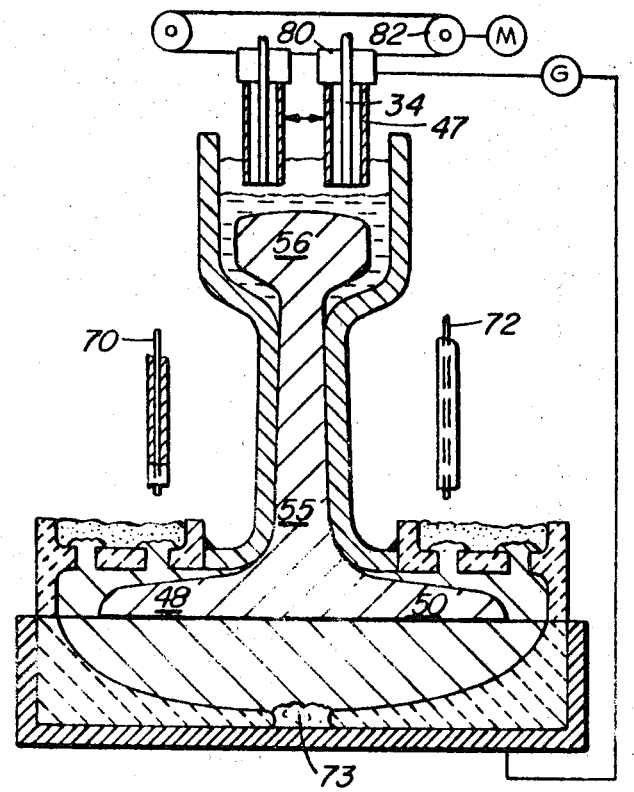
FIG. 3 is a cross-sectional view of another embodiment of the apparatus of the present invention for butt-welding rail joints.

In operation a submerged arc welding composition (typically Linde ® type 30 flux) in granular form is added to the bottom of the crucible and an initial arc is struck between electrode 34 and box 40, through hole 73 provided for that purpose, using any conventional arc striking device such as a ball of steel wool. The welding composition melts to form a pool in the crucible 43, and the process changes from an open-arc mode to a submerged arc mode. As welding continues, metal and slag rise in the crucible and contact electrodes 70, 72 which are then energized. Welding continues and eventually metal and slag is displaced from the crucible through 58 and 60 and vent holes 62, 64 if the apparatus is so provided. When metal appears through holes 58 and 60 it is a signal that welding in the flange area is complete and that welding with electrodes 70, 72 can be discontinued. Welding of the web area proceeds, as is conventional, with central electrode guide tube 47 being slowly melted back until welding of the web and head areas is complete. On completion of welding, excess metal in the crucible may be ground away from the flange area. The design of the shape of the crucible cavity is such so as to provide a final weldment that may preferably allow the excess metal to be left on. It will, of course, be appreciated that the cross sectional area of the head 56 is considerably greater than that of web 55, and for this reason some of the problems associated with welding of the flange may also be apparent when welding the head. Such problems may be avoided, however, by the use of multiple welding wires for welding the head in an analagous manner to the welding of the flanges, or by use of an oscillating welding head 80 driven by any suitable motor means 82, as shown in FIG. 3. A principle advantage of the multi-head welding technique described herein is the reduction in welding current requirements and the equitable distribution of power generation across the large areas of the weld. As noted above, with a single welding head, D.C. current requirements were in excess of 1000 amps D.C., whereas with the multi-head technique described with reference to FIGS. 2 and 3, total welding current requirements were reduced to about 450–600 amps D.C. or 150–200 amps D.C. per electrode. Such current requirements are well within the capacity of portable welding equipment and hence the process is suitable for mobile or field use as well as in-plant welding.

Figure 4:
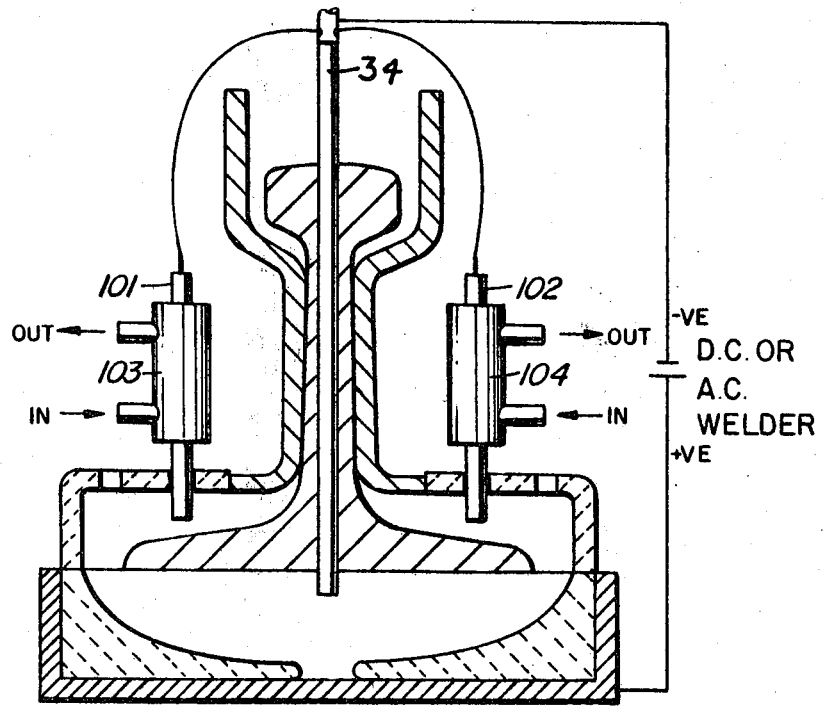
FIG. 4 is a cross-sectional view of an alternate embodiment of the apparatus of the present invention.

FIG. 4 illustrates a further embodiment of the invention in which the consumable type electrodes 70, 72 are replaced by water cooled non-consumable type electrodes 101, 102 generally of tungsten, molybdenum or the like, or even semi-consumable electrodes (in the sense that oxidation to carbon monoxide occurs) of graphite. Electrodes 101, 102 are provided with water cooled jackets and clamps 103, 104. In this embodiment electrodes 101, 102 do not provide any of the weld metal necessary to fill the gap, all of which is supplied by consumable central electrode 34, but rather act as auxilliary sources of heat energy to ensure complete melting and welding at the extremities of the flanges. In other respects the process using the apparatus of FIG. 4 is identical to the process used with the apparatus of FIGS. 2 and 3.

While the invention has been described herein with particular reference to steel rail joints it will be appreciated by those skilled in the art that the principles thereof are applicable for welding almost any weldable metallic materials, particularly those materials having irregular shape and cross section. For example, other ferrous alloys such as cast iron alloys may be welded readily by this process, and the process may also be applied to non-ferrous materials such as aluminum and alloys thereof.

I claim:

1. A method of welding a butt-joint between spaced opposing end faces of elongated metallic members having an irregular cross sectional area, corresponding to head, web and flange parts of a railroad rail, which comprises:
   (a) providing a ceramic-lined crucible, including electrically conductive means, to substantially completely enclose said flange parts adjacent the end faces to be welded;
   (b) positioning a consumable metal central electrode substantially vertically in said crucible in alignment with said web;
   (c) positioning at least two additional electrodes substantially vertically in said crucible adjacent respective outer ends of said flanges;
   (d) providing means in said crucible whereby an arc may be struck between said electrodes and said electrically conductive means;
   (e) locating wall molds on opposite sides of said web and head parts adjacent said end faces to be welded thereby forming a mold space adjacent and in fluid communication with said crucible;
   (f) adding a submerged melt welding slag composition to said crucible;
   (g) supplying electric welding current to said central electrode and electrically conductive means to melt said welding composition, said central electrode at the tip thereof and adjacent metal of said end faces and at least partially fill said crucible with weld metal under a blanket of molten submerged melt welding composition;
   (h) supplying electric welding current to said additional electrodes and weld metal while continuing to supply welding current to said central electrode so as to completely fill said crucible and fusion weld said flange parts together; and
   (i) continuously melting said central electrode downwardly into the melt until the mold space between said wall molds and said web and head end faces is filled with weld metal under a blanket of molten submerged-melt welding composition, thereby fusion welding said web and head parts together.

2. A method as claimed in claim 1 wherein said members are steel railroad rails.

3. A method as claimed in claim 2 including water cooling said wall molds.

4. A method as claimed in claim 1, including transversely oscillating said central electrode at least during welding of head part in step (i).

5. A method as claimed in claim 1, wherein said electrically conductive means is an electrically conductive box containing said ceramic lined crucible.

6. A method as claimed in claim 1, wherein said additional electrodes are non-consumable electrodes, and including the step of water cooling said additional electrodes.

7. A method as claimed in claim 1, wherein said additional electrodes are consumable electrodes and including the step of melting and additional electrodes into said melt.

8. Apparatus for butt-joint welding of metallic members having an irregular cross-sectional area corresponding to head, web and flange parts of a railroad rail, comprising:
   a ceramic lined crucible having lid means and including an electrically conductive means, to substantially completely enclose said flange parts adjacent said joint;
   weld metal contour shaping conductive molds located on opposite sides of said web and head at such joint;

a central, consumable metal electrode disposed substantially vertically in said crucible in alignment with said web;
at least two additional electrodes disposed through said lid means and extending into said crucible adjacent respective outer ends of said flanges;
and electric submerged melt welding means including means for continuously feeding a submerged melt welding composition into said crucible, means for supplying electric welding current to said central electrode and electrically conductive means so as to melt said composition, said central electrode at a tip thereof and adjacent metal and at least partially fill said crucible with weld metal and a protective blanket of molten said composition, means to supply electric welding current to said additional electrodes and weld metal while continuing to supply welding current to said central electrode so as to completely fill said crucible and fusion weld said flange parts together, and means for continuing to supply current to said central electrode and feed submerged metal welding composition until the space between said molds on opposite sides of said web and head is also filled.

9. Apparatus as claimed in claim 8 wherein said weld metal contour shaping molds are water cooled.

10. An apparatus as claimed in claim 9 wherein said molds are water cooled copper molds.

11. An apparatus as claimed in claim 8, wherein said electrically conductive means comprises box means containing said ceramic lined crucible.

12. An apparatus as claimed in claim 8, including means to transversely oscillate said central electrode at least during welding of said head.

13. An apparatus as claimed in claim 8, wherein said additional electrodes are consumable metal electrodes.

14. An apparatus as claimed in claim 8, wherein said additional electrodes are water cooled non-consumable electrodes.

* * * * *